Feb. 12, 1952    J. P. GALLAGHER ET AL    2,585,453
INTERCHANGEABLE, SELF-RELEASING, SELF-LOCKING
HIGH-PRESSURE TUBE AND PIPE CONNECTOR UNIT
Filed April 8, 1949                                  2 SHEETS—SHEET 1
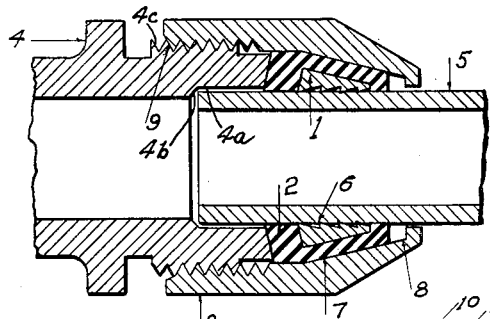
Fig.1
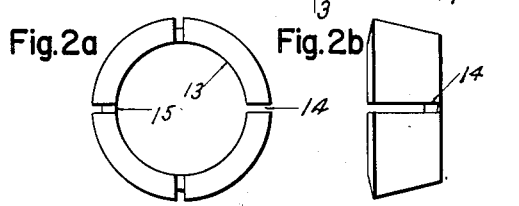 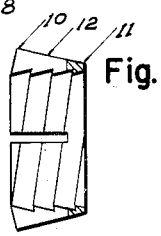
Fig.2a    Fig.2b    Fig.2c
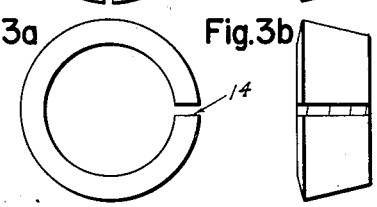 
Fig.3a    Fig.3b    Fig.3c
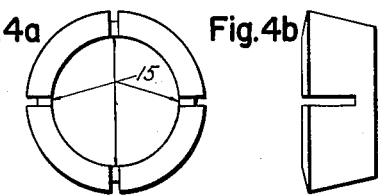 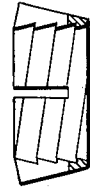
Fig.4a    Fig.4b    Fig.4c
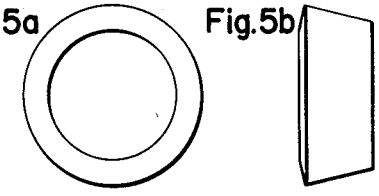 
Fig.5a    Fig.5b    Fig.5c
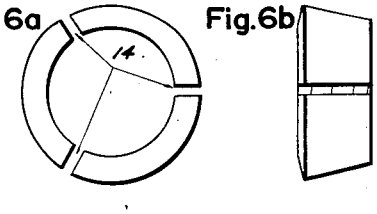 
Fig.6a    Fig.6b    Fig.6c
INVENTORS
John P. Gallagher
James H. Gidlund Feb. 12, 1952     J. P. GALLAGHER ET AL     2,585,453
INTERCHANGEABLE, SELF-RELEASING, SELF-LOCKING
HIGH-PRESSURE TUBE AND PIPE CONNECTOR UNIT
Filed April 8, 1949     2 SHEETS—SHEET 2
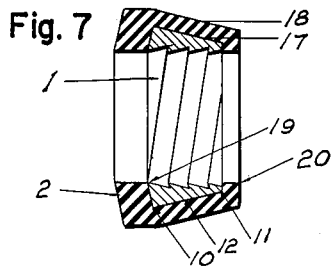
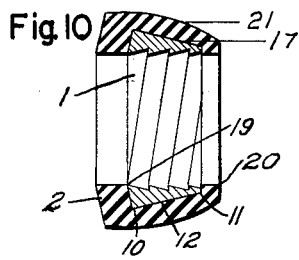
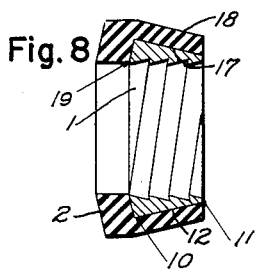
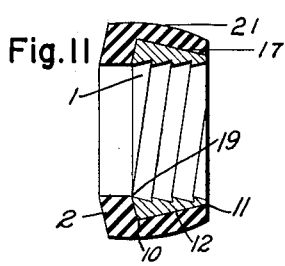
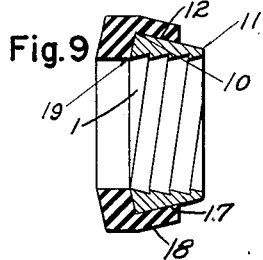
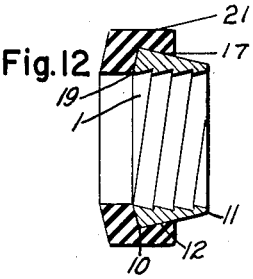
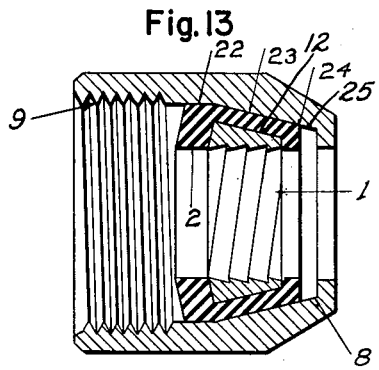
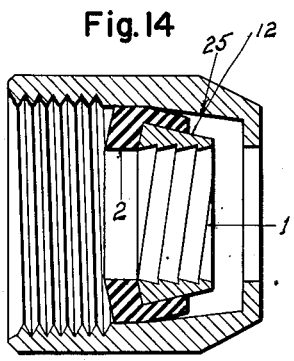
INVENTORS
John P. Gallagher
Jonas H. Gidlund Patented Feb. 12, 1952

2,585,453

UNITED STATES PATENT OFFICE 2,585,453

INTERCHANGEABLE, SELF-RELEASING, SELF-LOCKING HIGH-PRESSURE TUBE AND PIPE CONNECTOR UNIT

John P. Gallagher and Jonas H. Gidlund, Chicago, Ill.

Application April 8, 1949, Serial No. 86,322

8 Claims. (Cl. 285—122)

The interchangeable, self-locking, self-releasing high pressure tube and pipe connector unit, forming the present invention is a valuable and useful fastening device in the field of hydraulics or any other related field of industry where tubing and piping is used to convey liquids, and gases.

There have been a great number of pipe and tube connectors invented. Some of them function well under certain conditions, but fail under other unfavorable conditions. Others too, appear as if they would function well but, their design and construction does not lend themselves to be manufactured inexpensively. A product that is too expensive to fill a given task or to be competitive with other products in its related field is impractical.

One of the chief emphases that was stressed in the development of this interchangeable connector unit was that it must consist of as few parts as possible. Its components must be of the simplest construction and they must lend themselves to the most advanced and feasible means of manufacturing on a mass production basis.

In a great number of connectors their design is feasible for manufacturing in sizes that are made to connect one-half inch pipe and tubing and over. But, when they are reduced to connect smaller pipe and tube there is found no known inexpensive way to construct them if they can be constructed at all. This narrows the field of connectors that can be manufactured in all ranges of sizes.

The field is further narrowed by those connectors that function well on only certain types of materials, especially in the field of flared tubing, where flaring of certain types of welded steel and seamless alloyed steel tubing is impossible.

Again the field is narrowed by those types of connectors that will not stand vibration, and in addition will cause defecting and work hardening the tube by the amount of friction and stress they exert upon the tube. And again the field is narrowed by those types of connectors that will operate only under low pressures, and further yet by those types of connectors that are shrunk, sweated, beaded, or soldered on to the pipe or tube. As they can not be removed, a whole new unit must be purchased if a new tube is to be installed.

It is in our estimation that an all around practical and useful tube and pipe connector must have the following properties. These properties were again stressed in the development of this interchangeable connector unit and possess all of them to a great degree.

First of all a connector unit must be simple and it must contain as few parts as possible. It must be inexpensive to manufacture. It must be capable of being made to function on all commercial sizes of pipe and tubing. It must have great holding power not only from stress but also from high internal pressures. It must work equally well on all types of materials used in commercial pipe and tubing. It must be capable of being assembled by the most inexperienced layman. It must not set up any unnecessary strains upon the tube or pipe. It must work well under high or low temperatures. It must be capable of maintaining its sealing and locking power and not set up any undue stress upon the pipe or tube under excess vibrations. It must be capable of being easily disengaged from the pipe or tube. The unit must be capable of being used over again many times. It must be capable of being connected and disconnected from the tube or pipe many times without damaging them.

In the drawing:

Figure 1 is a longitudinal sectional view of the assembled connector unit;

Figures 2a, 2b and 2c to 6a, 6b and 6c inclusive illustrate various forms of interchangeable connector rings, the postscripts a, b and c in each series indicating an end elevation view, a side elevational view, and a longitudinal sectional view, respectively;

Figures 7 to 12, inclusive, are longitudinal sectional views of the interchangeable connector rings inclosed in the connector seals, illustrating various forms of seals; and Figures 13 and 14 are longitudinal sectional views of the interchangeable connector nut, ring, and seal, illustrating different forms of connector unit.

The detailed description of the invention as shown in the above mentioned drawings, and the functions thereof, as follows:

The connector unit as shown in Figure 1 consists of a body 4 forming part of a tube, or being an adapter connected to a tube, and having a central passage terminating in an enlargement 4a for receiving one end of a tube 5. The portion of the body 4 surrounding the tube has a tapered, dish-shape end face 4b. The body 4 has external threads 4c.

Surrounding the tube 5 is an interchangeable connector ring 1, composed of hard metal having internal spiral teeth 6 which are of opposed direction to the threads 4c. The ring 6 has a tapered outer surface and is disposed with its greater diameter end innermost in the assembled connector unit. Other characteristics of the ring will be referred to in connection with Figures 2 to 6.

Surrounding the ring 6 is an interchangeable seal 2 in the form of a ring. The seal illustrated in Figure 1 extends in over both ends of the ring 1 toward the tube 5. The seal 2 is of any preferred material having the desired ductile, resilient, and vibration dampening characteristics. Specific forms of seal will be described in connection with Figures 7 to 12.

An interchangeable connector nut 3 surrounds the tube 5 and encloses the ring 1 and seal 2. The unit 3 has internal threads 9 at one end for threading on the threads 4c, and an unthreaded internal surface 8, the surface 8 being tapered with its end of greater diameter adjacent the threads 9.

Threading the nut 3 onto the threads 4c compresses the seal 2 which creates a sealing and vibration dampening upon the tube or pipe, which in turn causes compression of the interchangeable connector ring and forces its spiral teeth 6 to be imbedded in the tube or pipe 5 creating a gripping and locking effect thereon.

The ring and seal may be disengaged from the tube or pipe 5 by disengaging the nut 3 from the connector body 4, this action will create a turning effect upon the interchangeable connector seal, whose outside surface 7 that has been compressed into the unthreaded portion 8 of the nut; this action, in turn, will cause a turning effect upon the ring forcing its spiral teeth, which have opposed directional spiral to the directional spiral of the threads 4c and 9, to thread themselves off the tube or pipe, the action being completed when the nut has disengaged the body.

The action is defined as a synchronized action, and is set out in the following formula:

$$\frac{[1-(S1+S2)]N \times NT \times R}{P} = RS$$

wherein

N represents the unit length, axially, of internal threads 9 of the connector nut 3;

NT represents the number of threads 9 per unit length, axially;

R represents the axial length of the connector ring 1;

P represents the distance the connector ring 1 moves axially over the tube 5 as the nut 3 is threaded onto the body 4;

S1 represents the coefficient of slippage between the connector ring 1 and the connector seal 2;

S2 represents the coefficient of slippage between the connector seal 2 and the connector nut 3; and RS represents the number of spiral teeth in the connector ring 1.

A delayed action or an accelerated action, can be achieved by varying the number of spiral teeth in the connector ring 1 in relationship to the number of threads 9 of the connector nut 3.

In Figures 2a, 2b and 2c, is an interchangeable connector ring 1 whose spiral teeth have opposed directional spiral to the directional spiral of the interchangeable connector nut and body threads 4c and 9, as shown in Figure 1; the numeral 10 indicates the large-diameter end or extremity of the connector ring, and 11 indicates the small-diameter end; the numeral 12 indicates the outer tapered surface that is formed between the large and small extremity, the surface 12 being non-parallel with the inside surface; the numeral 13 refers to the apex of the spiral teeth of the interchangeable connector ring; a slot 14 is cut through the ring, both radially and axially; and allows for the expansion and contraction of the connector ring; one or more slots 15 are equally spaced around the circumference of the large extremity the slots being cut through the ring radially, but extending axially from the large end to a position short of the small end; these additional slots 15 aid in the expansion and the contraction of the connector ring; the width of slots 14, and 15, controls the amount the inside diameter 13, can be contracted. This interchangeable ring may be used for most general types of application.

Figures 3a, 3b and 3c illustrate an interchangeable connector ring that is similar to that of Figures 2a, 2b and 2c except that it has only one slot, and that slot extends the entire axial length of the ring. This interchangeable ring is designed for use where a small amount of compression is desired as would be required on extremely light wall tubing.

Figures 4a, 4b and 4c illustrate an interchangeable connector ring that is also similar to that of Figures 2a, 2b and 2c, except that it contains no slot that extends its entire axial length, and has a plurality of slots extending a portion of its axial length. This interchangeable ring is used where a more permanent and rigid locking effect is desired.

Figures 5a, 5b and 5c illustrate an interchageable connector ring that is also similar to that of Figures 2a, 2b and 2c, except that it contains no slots. It is designed for use on non-metallic tubing such as plastic.

Figures 6a, 6b and 6c illustrate an interchangeable connector ring that is also similar to that of Figures 2a, 2b and 2c except that its slots extend its entire axial length, creating segments. This interchangeable ring is designed for use on large diameter tubes and pipe as its design lends itself to more economical construction due to the large saving in material.

Figure 7, is a view of an interchangeable connector seal that may be used with any of the five interchangeable connector rings as shown in Figures 2 to 6, inclusive. The interchangeable connector ring 1 is enclosed in the interchangeable connector seal 2 which is a circular band composed of ductile resilient vibration dampening material; when the seal is under compression by the nut 3 being connected to the body 4, as shown in Figure 1, the inner surface 17 of the seal is parallel with the outside surface 12 of the ring, and the outer surface 18 is also parallel with the inner surface; the seal has an inturned flange engaging the inner or forward surface of the ring as indicated at 19, and another inturned flange engaging the outer or rearward surface of the ring as indicated at 20.

This interchangeable seal is designed for use where there is a minimum amount of stress and a maximum amount of vibration present.

Figure 8 is a view of an interchangeable connector seal that is similar to that of Figure 7, except that it terminates substantially flush with the outer or rearward end of the ring.

This interchangeable seal is designed for use where there is a moderate amount of stress and vibration present.

Figure 9 is a view of an interchangeable connector seal that is similar to that of Figure 7, except that it terminates short of the outer or rearward end of the ring.

This interchangeable seal is designed for use where there is a maximum amount of stress and minimum amount of vibration present.

Figure 10 is a view of an interchangeable connector seal that is similar to that of Figure 7, except that its outside surface 21 is non-parallel with its inside surface 17 when under compression by the nut 3 being connected to the body 4, as shown in Figure 1.

This interchangeable seal is used where there is a great amount of flexibility desired, and a minimum amount of vibration present.

Figure 11 is a view of an interchangeable connector seal that is similar to that of Figure 8, except that its outside surface 21 is non-parallel with its inside surface 17 when under compression by the nut 3 being connected to the body 4, as shown in Figure 1.

This interchangeable seal is used where there is a great amount of flexibility desired and a moderate amount of stress and vibration present.

Figure 12 is a view of an interchangeable seal that is similar to that of Figure 9, except that its outside surface 21, is non-parallel with its inside surface 17, when under compression by the nut 3 being connected to the body 4, as shown in Figure 1.

This interchangeable seal is used where there is a great amount of flexibility desired and a maximum amount of stress and a minimum amount of vibration present. This interchangeable seal lends itself to most general applications.

In Figure 13 is shown an interchangeable connector nut 3 that may be used with any combination of interchangeable connector rings and connector seals as shown in Figures 2 to 12, inclusive. The nut has an unthreaded portion 8 and a threaded portion 9. The unthreaded portion 8 engages the seal 2 and compresses the ring 1, when the threads 9 are threaded onto the threads 4c. The unthreaded portion 8 has a tapered surface 23, with a large diameter end adjacent the threads 9, and a small diameter end 24. The tapered surface 23 is parallel with the outer surface of the connector ring 1.

This interchangeable nut is designed for use where the amount of vibration present is great.

In Fig. 14 is shown an interchangeable connector nut 3' that may be used with any combination of interchangeable connector rings and interchangeable connector seals as shown in Figures 2 to 12, inclusive, and is similar to the nut 3 shown in Figure 13, except that its inside surface 25 is non-parallel with the outside surface of the connector ring 1.

This interchangeable nut is designed for use where the tube or pipe is subjected to sudden and severe thrust, but it is well adaptable for use under most conditions.

The resilient sealing ring 2 provides the supporting connection between the tube 5 and connector ring 1 on the one hand, and the nut 3 and body 4 on the other hand; there is no metal-to-metal contact connection between the body 4 and tube 5.

It should be understood that there are sixty different combinations of connector units that could be assembled from the five interchangeable connector rings, six interchangeable connector seals, and two interchangeable connector nuts. That a connector unit could be assembled from these interchangeable components that would result in maximum efficiency in relationship to the amount of internal pressure, vibration, stress, torque, and thrust present or degree of flexibility required of the unit.

It should be further understood that the unit may be part of any special or standard tube or pipe fitting.

That many changes may be made in the details of construction of the parts, without departing from the spirit of the invention as set forth in the appended claims.

What we claim is:

1. In a connector unit, a body and a tube adapted to be connected together, a nut surrounding said tube and threaded on said body, a connector ring surrounding said tube within said nut, said connector ring having internal spiral teeth engaging said tube, the teeth of said connector ring being of opposed spiral direction to the threads between said nut and body, and a sealing ring of resilient material surrounding said tube and forming a seal between said connector ring and nut, said nut on being threaded on said body, engaging said sealing ring and forcing said connector ring into gripping engagement with said tube.

2. In a connector unit, a body and a tube adapted to be connected together, a nut surrounding said tube and threaded on said body, said nut having an internal tapered surface, a connector ring surrounding said tube within said nut and having internal teeth engaging said tube and an external tapered surface, and a resilient sealing ring interposed between the tapered surfaces on said connector ring and nut, said nut, on being threaded onto said body, acting through said sealing ring for causing said connector ring to grip said tube.

3. In a connector unit, a body and a tube adapted to be connected together, a nut surrounding said tube and threaded on said body, said nut having an internal tapered surface, a connector ring surrounding said tube within said nut and having internal spiral teeth engageable with said tube, said teeth being of opposed spiral direction to the threads between said nut and body, said connector ring having an external tapered surface, and a resilient sealing ring surrounding the peripheral tapered surface of said connector ring, said sealing ring having an inturned radial flange extending over each end of said connector ring toward said tube, said nut, on being threaded onto said body, acting through said sealing ring for causing said connector ring to grip said tube.

4. In a connector unit, a body and a tube adapted to be connected together, a nut surrounding said tube and threaded on said body, said nut having an internal tapered surface, a connector ring surrounding said tube within said nut and having internal spiral teeth engageable with said tube, said teeth being of opposed spiral direction to the threads between said nut and body, said connector ring having an external tapered surface, and a resilient sealing ring surrounding the peripheral tapered surface of said connector ring, said sealing ring having an inturned radial flange extending between said connector ring and body, and the other end of said sealing ring terminating substantially flush with the adjacent end of said connector ring, said nut, on being threaded onto said body, acting through said sealing ring for causing said connector ring to grip said tube.

5. In a connector unit, a body and tube adapted to be connected together, a nut surrounding said tube and threaded on said body, said nut having an internal tapered surface, a connector ring surrounding said tube within said nut and having internal spiral teeth engageable with said tube, said teeth being of opposed spiral direction to the threads between said nut and body, said connector ring having an external tapered surface, and a resilient sealing ring surrounding the peripheral tapered surface of said connector ring, said sealing ring having an inturned radial flange extending between said connector ring and body, and the other end of said sealing ring terminating short of the opposite end of said connected ring, said nut, on being threaded onto said body, acting through said sealing ring for causing said connector ring to grip said tube.

6. In a connector unit, a body and tube adapted to be connected together, a nut surrounding said tube and threaded on said body, said nut having an internal tapered surface, a connector ring surrounding said tube within said nut and having internal spiral teeth engageable with said tube, said teeth being of opposed spiral direction to the threads between said nut and body, said connector ring having an external tapered surface, said tapered surfaces being substantially parallel, and a resilient sealing ring interposed between said tapered surfaces, said nut, on being threaded onto said body, acting through said sealing ring for causing said connector ring to grip said tube.

7. In a connector unit, a body and a tube adapted to be connected together, a nut surrounding said tube and threaded on said body, said nut having an internal tapered surface, a connector ring surrounding said tube within said nut and having internal spiral teeth engageable with said tube, said teeth being of opposed spiral direction to the threads between said nut and body, said connector ring having an external tapered surface, said tapered surfaces being nonparallel, and a resilient sealing ring interposed between said tapered surfaces, said nut, on being threaded onto said body, acting through said sealing ring for causing said connector ring to grip said tube.

8. In a connector unit, a body and a tube adapted to be connected together, a nut surrounding said tube and threaded on said body, said nut being moved axially of said body when being threaded thereonto, a connector ring surrounding said tube, and means reacting between said nut and connector ring tending to cause rotation of said connector ring in response to rotation of said nut and tending to cause relative axial movement between said connector ring and tube in a direction opposite the relative axial movement between said nut and body.

JOHN P. GALLAGHER.
JONAS H. GIDLUND.

REFERENCES CITED

The following references are of record in the file of this patent:

UNITED STATES PATENTS

| Number | Name | Date |
|---|---|---|
| 87,993 | Weston | Mar. 16, 1869 |
| 2,152,975 | Sanford | Apr. 4, 1939 |
| 2,232,513 | Confer | Feb. 18, 1941 |
| 2,529,552 | Herold | Nov. 14, 1950 |